(12) United States Patent
Ramotowski et al.

(10) Patent No.: US 12,287,313 B1
(45) Date of Patent: Apr. 29, 2025

(54) SINGLE LAP SHEAR TEST SAMPLE MOLD

(71) Applicant: The United States of America as represented by the Secretary of the Navy, Newport, RI (US)

(72) Inventors: Thomas S Ramotowski, Tiverton, RI (US); Anthony S Poirier, Westport, MA (US)

(73) Assignee: The United States of America as represented by the Secretary of the Navy

( * ) Notice: Subject to any disclaimer, the term of this patent is extended or adjusted under 35 U.S.C. 154(b) by 263 days.

(21) Appl. No.: 17/815,964

(22) Filed: Jul. 29, 2022

(51) Int. Cl.
| | | |
|---|---|---|
| *B29C 33/30* | (2006.01) | |
| *G01N 3/24* | (2006.01) | |
| *G01N 3/62* | (2006.01) | |
| *B29L 31/40* | (2006.01) | |

(52) U.S. Cl.
CPC ............ *G01N 3/62* (2013.01); *B29C 33/30* (2013.01); *G01N 3/24* (2013.01); *B29L 2031/40* (2013.01); *G01N 2203/0025* (2013.01)

(58) Field of Classification Search
CPC .... G01N 3/62; G01N 3/24; G01N 2203/0025; B29C 33/30; B29L 2031/40; B25B 11/02
See application file for complete search history.

(56) References Cited

U.S. PATENT DOCUMENTS 2,262,827 A * 11/1941 Wilson, Jr. ............... B25H 1/00
269/910
2023/0158789 A1* 5/2023 Selter ..................... B29C 66/00
156/60

\* cited by examiner

*Primary Examiner* — Monica A Huson
(74) *Attorney, Agent, or Firm* — James M. Kasischke; Michael P. Stanley; Jeffry C. Severson

(57) ABSTRACT

A mold is configured to make several identical single lap shear test samples according standards at one time. The mold can be made from aluminum and cast pieces of silicone rubber. The mold's shorter sides have slots designed to hold rigid substrates. The rigid substrates are inserted into the slots after the area to be bonded has been coated with adhesive. The opposing slots for each sample are offset so that the substrates overlap by the prescribed amount in the standard in the center of the mold. Spacer pieces are provided between the substrates. The slots and spacer pieces hold the substrates rigidly together to ensure a thin adhesive bondline between the two rigid substrates.

12 Claims, 4 Drawing Sheets

-PRIOR ART-

SINGLE LAP SHEAR TEST SAMPLE MOLD

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

BACKGROUND OF THE INVENTION

1) Field of the Invention

The present invention is directed to a mold for making multiple single lap shear test samples at one time.

2) Description of the Related Art

Single lap shear test samples are commonly made and evaluated to measure the shear strength of adhesive bonds. The ASTM D-1002 standard specifies the procedure for lap shear tests for metal-to-metal bonded specimens. The test is applicable for determining adhesive strength, surface preparation parameters, and adhesive environmental durability.

FIG. 1 shows a single lap shear test sample, indicated generally as 102, as specified in the ASTM D-1002 standard. The test sample 102 consists of two rigid substrates 104 attached to each other via an overlapping joint 106. The test sample 102 is 25.4 mm (1") wide, with an overlap of 12.7 mm (0.5") in the bonded area 108. The recommended metal thickness is 1.62 mm (0.064") and the overall length of the test sample 102 should be 177.8 mm (7"). Adhesive is applied to each of the rigid substrates 104 in the area of the overlapping joint 106 and the adhesive is allowed to cure. Once cured, the test sample 102 is placed in the grips of a universal testing machine and pulled until rupture occurs.

The ASTM D-1002 standard provides a model that tells the experimenter what the single lap shear test sample should look like (giving dimensions for the size of the two sample substrates and the extent the adhesive should be applied to both substrates). There remains a need for a mold that can be used to make multiple single lap shear test samples at one time.

OBJECT AND SUMMARY OF THE INVENTION

It is an object of the present invention to provide a mold for making multiple identical single lap shear test samples at one time.

It is another object of the invention to provide a mold for making samples, according to the ASTM D-1002 standard.

It is yet another object of the present invention to provide a mold that ensures that the two rigid substrates of the single lap shear test samples remain aligned with each other.

It is a further object of the present invention to provide a mold that ensures that the area of overlap between the two rigid substrates (where the adhesive bond is located) is consistent from sample to sample.

The invention described herein is a mold that is sized and configured to make several identical single lap shear test samples, according to the ASTM D-1002 standard, at one time. In some embodiments, the mold is made from aluminum and cast pieces of silicone rubber. The mold's shorter sides have slots providing a close sliding fit designed to hold rigid substrates of the single lap shear test samples, according to the ASTM D-1002 standard. The rigid substrates are inserted into the slots after the area to be bonded has been coated with a thin layer of adhesive. The opposing slots for each sample are offset so that the substrates overlap in the center of the mold by the prescribed amount in the ASTM D-1002 standard. The slots hold the substrates rigidly together to ensure the overlapped portions are in close physical contact to ensure a thin adhesive bondline between the two rigid substrates.

According to an embodiment of the invention, there is provided a device for making multiple single lap shear test samples. The device includes a base plate extending along a horizontal plane and having a pair of two opposite long side edges. A pair of sidewalls is attached to the pair of two opposite long side edges. A first end block is located on a first end of the base plate. The first end block extends between the pair of sidewalls and is attached to the pair of sidewalls. The first end block has a first plurality of sample receiver slots along an inner surface of the first end block. A second end block is located on a second end of the base plate. The second end block extends between the pair of sidewalls and is attached to the pair of sidewalls. The second end block has a second plurality of sample receiver slots along an inner surface of the second end block. The second plurality of sample receiver slots is aligned offset from the first plurality of sample receiver slots. Spacer pieces are provided for insertion between the substrates and between the substrates and sidewalls.

According to another embodiment of the invention, a mold has a base plate with two opposing long sides and two opposing short sides. Sidewalls are attached to the two opposing long sides of the base plate. The sidewalls are perpendicular to the base plate. End blocks are adjacent to the two opposing short sides of the base plate and attached to the sidewalls. The end blocks have a plurality of sample receiver slots along an inner surface thereof.

According to a method of simultaneously bonding a plurality of single lap shear test samples, a base plate extending along a horizontal plane and having a pair of two opposite long side edges. A pair of sidewalls is attached to the pair of two opposite long side edges. A first end block is located on a first end of the base plate. The first end block extends between the pair of sidewalls and is attached to the pair of sidewalls. The first end block has a first plurality of sample receiver slots along an inner surface of the first end block. A second end block is located on a second end of the base plate. The second end block extends between the pair of sidewalls and is attached to the pair of sidewalls. The second end block has a second plurality of sample receiver slots along an inner surface of the second end block. The second plurality of sample receiver slots is aligned offset from the first plurality of sample receiver slots. Single lap shear test samples having a pair of rigid substrates with an overlapping adhesive joint are provided. The rigid substrates of the single lap shear test samples are inserted into the sample receiver slots of the first end block and second end block. Spacer pieces are inserted between adjacent rigid substrates and between the sidewalls and the rigid substrates to hold the single lap shear specimens together.

BRIEF DESCRIPTION OF DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
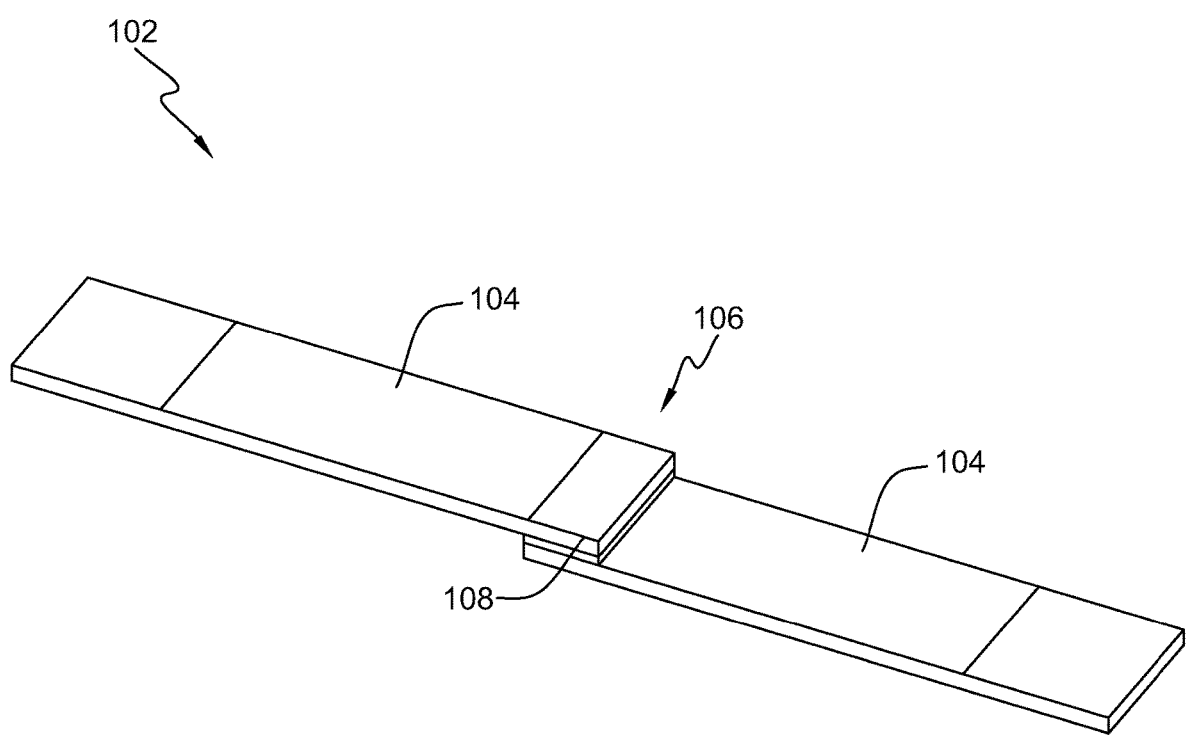
FIG. 1 is a perspective view of a single lap shear test sample, according to the prior art.
Figure 2:
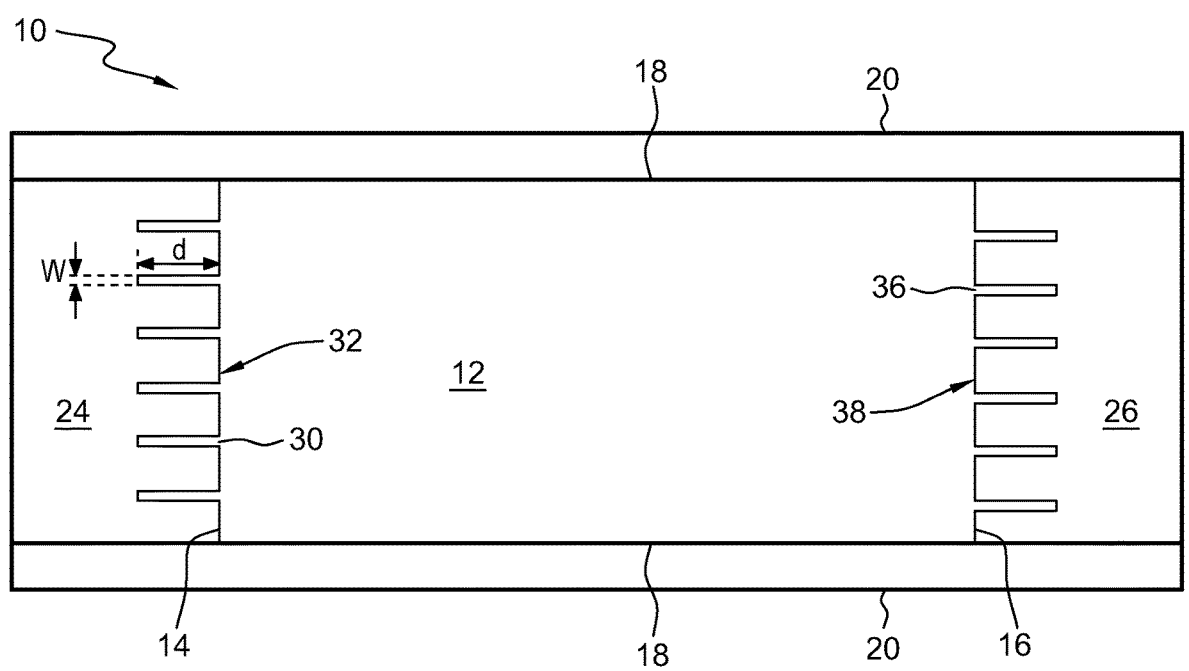
FIG. 2 is a top view of a mold for making single lap shear test samples.
Figure 3:
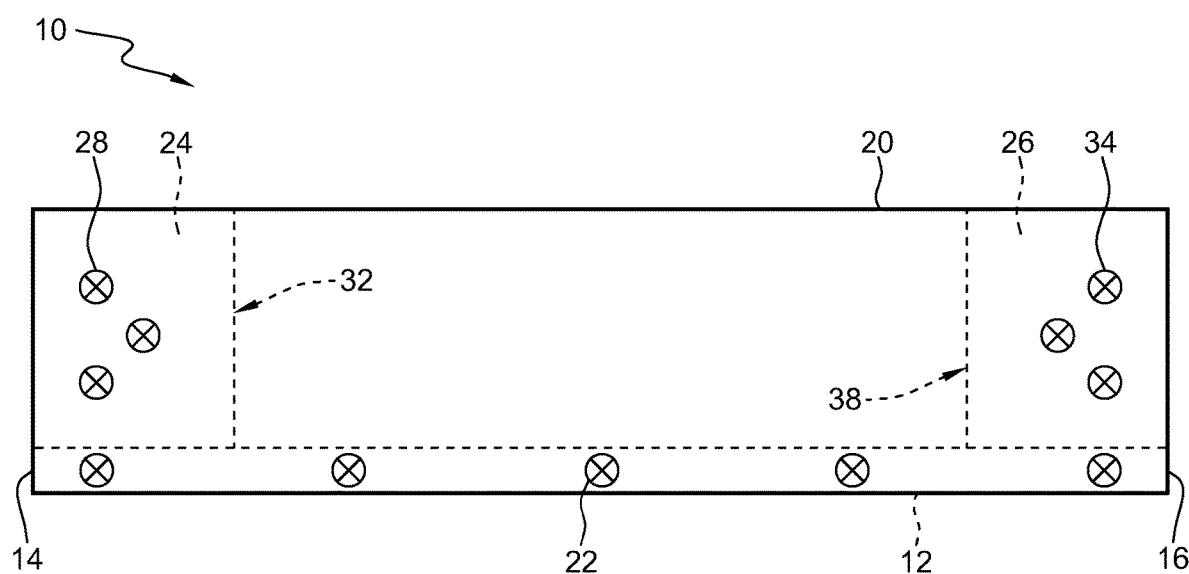
FIG. 3 is a side view of a mold for making single lap shear test samples.

Referring to the drawings, FIG. 2 and FIG. 3 show a mold, indicated generally as 10, according to the present invention. The mold 10 can be used for making multiple single lap shear test samples 102. The mold 10 includes a base plate 12. The base plate 12 extends along a horizontal plane having a first end 14, a second end 16, and a pair of two opposite side edges 18. A pair of sidewalls 20 is attached to the pair of two opposite side edges 18 by removable fasteners 22, such as screws or bolts. Each sidewall 20 is attached perpendicularly to one side edge 18 of the base plate 12. A first end block 24 is located on the first end 14 of the base plate 12 and a second end block 26 is located on the second end 16 of the base plate 12. The first end block 24 extends between the pair of sidewalls 20 and is attached to the pair of sidewalls 20 by removable fasteners 28, such as screws or bolts. A first plurality of sample receiver slots, as typically shown at 30, is provided along an inner surface 32 of the first end block 24. The second end block 26 extends between the pair of sidewalls 20 and is attached to the pair of sidewalls 20 by removable fasteners 34, such as screws or bolts. A second plurality of sample receiver slots, as typically shown at 36, is provided along an inner surface 38 of the second end block 26. The number of sample receiver slots in the first plurality of sample receiver slots 30 is the same as the number of sample receiver slots in the second plurality of sample receiver slots 36. The opposing sample receiver slots 30, 36 are in offset alignment so that the rigid substrates 104 overlap in the center of the mold 10 by the amount prescribed in the ASTM D-1002 standard.

Sample receiver slots 30, 36 are provided with a depth "d" to properly overlap rigid substrates 104 at the center of the mold 10. Sample receiver slots 30, 36 preferably have a width "W" that provides a close sliding fit with the received rigid substrates 104. The close sliding fit is optimal for keeping the rigid substrates 104 aligned and in contact with one another. Any kind of force or interference fit could cause difficulties in inserting the rigid substrates 104 or removing the test samples 102.

The mold 10 described herein is designed to make six identical single lap shear test samples 102, according to the ASTM D-1002 standard, at one time; however, the number of test samples 102 can vary depending on the number of sample receiver slots 30, 36 in each of the first end block 24 and the second end block 26. In some embodiments, the mold 10 is made of aluminum. Other appropriate materials can be used.

Figure 4:
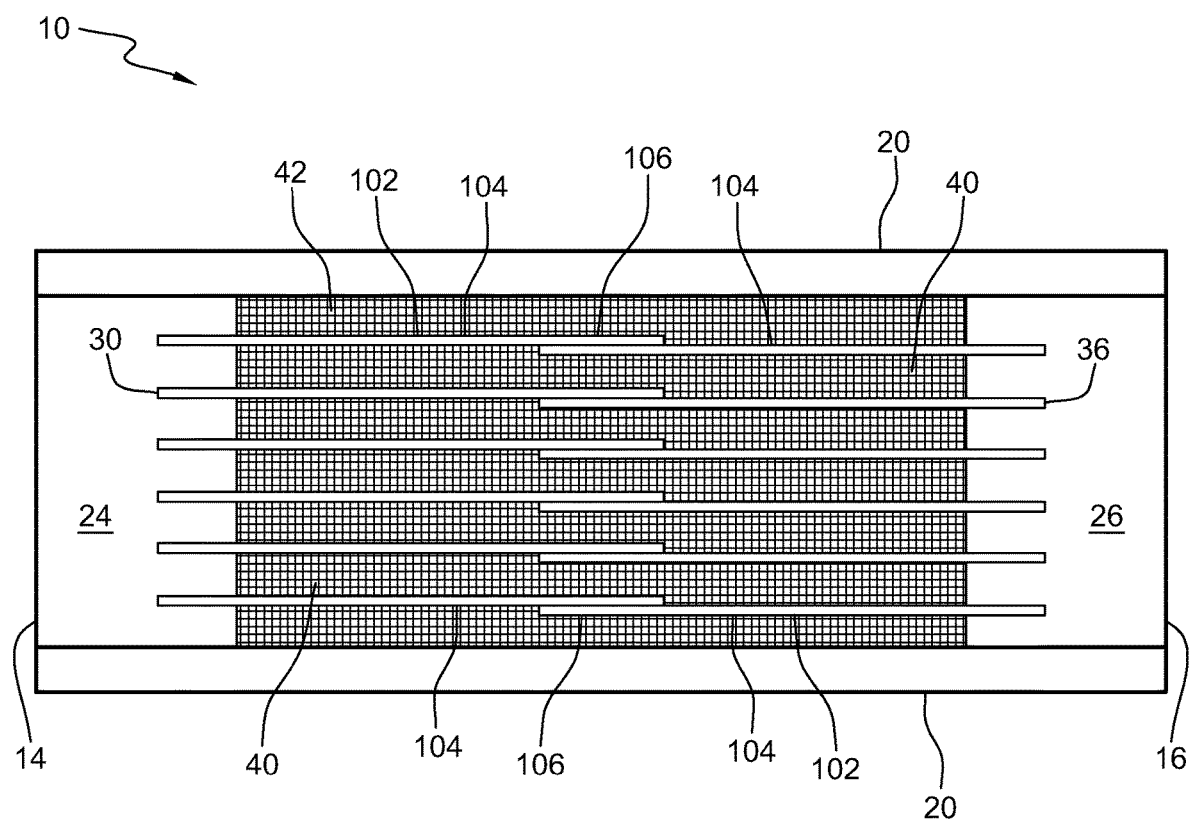
FIG. 4 is a top view of a mold for making single lap shear test samples containing test samples.

Referring now to FIG. 4, test samples 102 are placed in the mold 10 by inserting the rigid substrates 104 into the sample receiver slots 30, 36 in each of the first end block 24 and the second end block 26, after the area of the overlapping joint 106 to be bonded has been coated with a thin layer of adhesive. The sample receiver slots 30, 36 provide a close sliding fit with the rigid substrates 104 to hold the test samples 102 firmly in place for curing. As noted above, the opposing sample receiver slots 30, 36 for each test sample 102 are in offset alignment. The offset is the thickness of the rigid substrates 104 so that the rigid substrates 104 maintain angular alignment and overlap in the center of the mold 10 by the amount prescribed in the ASTM D-1002 standard.

In an optimal embodiment, end blocks 24 and 26 are identical parts. The sample receiver slots 30 and 36 are offset in the block such that when end blocks 24 and 26 are rotated for assembly a staggered collation effect is achieved. Sidewalls 20 are also identical. This approach simplifies manufacturing. Fewer unique parts to make also means fewer parts to keep track of.

While mold 10 is being used for creating test samples 102, spacer pieces 40 and 42 are provided to immobilize rigid substrates 104. The spacer pieces 40 and 42 are removable and positionable between the sidewalls 20 of the mold 10 and between the test samples 102. In some embodiments, the spacer pieces 40 and 42 may be made of an elastomeric material, such as molded silicone rubber. Preferably, spacer pieces 40 are molded to conform to the space between adjacent test samples 102, and spacer pieces 42 are molded to conform to the space between test sample 102 and sidewall 20. Thus, spacer pieces 40 will have opposing faces with two surfaces having different levels. Spacer pieces 42 will have one face with two surfaces having different levels, and one opposed face having a single level surface.

The spacer pieces 40 and 42 keep the area of the overlap joint 106 between the two rigid substrates 104 in close contact with each other to ensure a uniform bond. The sample receiver slots 30, 36 hold the rigid substrates 104 together to ensure the overlapped portions are in close physical contact and the spacer pieces 40 ensure pressure is constantly applied to the bonded area 108 to ensure a uniform bond is formed. Intimate contact between the rigid substrates 104 in the overlap joint 106 is further ensured by the compressive force exerted on the rigid substrates 104 when all of the spacer pieces 40 and 42 are inserted and the sidewalls 20 are attached to the base plate 12. The softness and flexibility of the spacer pieces 40 and 42 allow them to be easily inserted or removed from the mold 10, as needed.

As noted above, the mold 10 described herein is designed to make six test samples 102, at one time. If a smaller number of test samples 102 is desired, dummy samples made of rigid substrate pairs can be inserted into the sample receiver slots 30, 36 to allow the spacer pieces 40 and 42 to maintain the proper pressure on the bondlines of the real samples in the mold 10. The dummy samples are used to maintain compression on the test samples 102 while they cure in the mold 10 if fewer than six samples are being made. The dummy samples can be made of aluminum or other appropriate material and can be used to enable casting of the spacer pieces 40 and 42. In other words, mold 10 with dummy samples can be used as a mold for casting spacer pieces 40 and 42.

The mold 10 described herein enables several essentially identical single lap shear test samples 102 to be made at the same time. The mold 10 ensures that the opposing rigid substrates 104 remain in intimate contact with each other in the overlapping joint 106 (where the adhesive bond will form). The rigid substrates 104 are held in place by the sample receiver slots 30, 36 in the end blocks 24, 26 of the mold 10, while also being in contact with the base plate 12 of the mold 10. When the rigid substrates 104 are inserted properly into the sample receiver slots 30, 36 (i.e., all the way up against the end of the slots in the end blocks 24, 26 of the mold 10), the overlapping joint 106 is exactly one-half of a square inch (as specified in the ASTM D-1002 standard). This allows the results obtained from each test sample 102 to be directly compared to other samples.

The mold 10 allows for different test samples 102 to be made using different adhesives at the same time (i.e., all samples being made in the mold do not need to be made using the same adhesive). Different temperature cure profiles can easily be accommodated by the use of the dummy samples. Real samples can be removed and replaced with dummy samples to allow samples to experience different temperature cures, or to allow samples to spend different amounts of time curing at room temperature or in an oven.

The mold 10 can be disassembled to aid in removal of the individual test samples 102 without stressing or damaging the bonded area 108. Generally, the adhesives used to make the test samples 102 will not stick to the spacer pieces 40 and 42 of the mold 10 if the spacers are made from silicone rubber or RTV. When small amounts of cured adhesive become attached to the surfaces of the base plate 12, the sidewalls 20, or the spacer pieces 40, 42 of the mold 10, the mold 10 can be disassembled for cleaning.

The base plate 12 should be sprayed with a suitable mold release material prior to use to prevent the adhesive being used to make the test samples 102 from adhering to the base plate 12 (e.g., MS-122-AD aerosol mold release from Miller Stephenson Chemical Company or the like can be used for that purpose). Spacer pieces 40, 42 made of silicone rubber usually do not need to be sprayed with mold release, because very few adhesives bond to silicone rubber.

The dimensions of the mold 10 can be modified to allow the use of rigid substrates 104 of different lengths, widths, and thicknesses. The rigid substrates 104 do not necessarily need to be made of metal. For example, they could be made from rigid plastics like fiberglass or polyetheretherketone (PEEK). The size of the mold 10 could also be modified to allow more or fewer than six single lap shear samples to be made at one time.

An alternative embodiment could be made that omits base plate 12. Sidewalls 20 can be directly attached to end blocks 24 and 26. Alignment of the rigid substrates 104 and spacer pieces 40 and 42 can be performed by leveling against a flat surface. Operation of the mold will be similar; however, handling operations may be more difficult because test samples 102 and spacer pieces 40 and 42 can slip out of alignment. Adherence of test samples 102 to base plate 12 would no longer occur.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about" or "approximately") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

The invention claimed is:

1. A device for making multiple single lap shear test samples from rigid substrates, comprising:
   a base plate extending along a horizontal plane and having a pair of two opposite long side edges and a first and second end;
   a pair of sidewalls attached to said base plate, each sidewall being attached perpendicularly to one base plate long side edge;
   a first end block joined by removable fasteners to said base plate on the first end thereof, said first end block extending between said pair of sidewalls and being attached to said pair of sidewalls, said first end block having a first plurality of sample receiver slots along an inner surface of said first end block; and
   a second end block joined by removable fasteners to said base plate on the second end thereof, said second end block extending between said pair of sidewalls and being attached to said pair of sidewalls, said second end block having a second plurality of sample receiver slots along an inner surface of said second end block wherein said second plurality of sample receiver slots in said second end block are aligned offset from said first plurality of sample receiver slots in said first end block and wherein opposing sample receiver slots are offset to maintain alignment of two rigid substrates of the single lap shear test sample.

2. The device of claim 1, wherein opposing sample receiver slots in said first end block and said second end block are offset by an amount approximately equal to the thickness of one of the rigid substrates.

3. The device of claim 1, wherein opposing sample receiver slots are in offset alignment so that the two rigid substrates of the single lap shear test sample overlap when inserted in the sample receiver slots of said first end block and said second end block.

4. The device of claim 1, further comprising spacer pieces positionable between adjacent rigid substrates inserted in the sample receiver slots of said first end block and said second end block and between said sidewalls and the rigid substrates.

5. The device of claim 4, wherein said spacer pieces are molded from an elastomeric material to fill spaces defined by adjacent rigid substrates and spaces defined by said sidewalls and the adjacent rigid substrates.

6. A device for making multiple single lap shear test samples from rigid substrates, comprising:
   a first end block having a first plurality of sample receiver slots along an inner surface of said first end block;
   a second end block having a second plurality of sample receiver slots along an inner surface of said second end block;

a pair of sidewalls, each sidewall having a first end and a second end, said first end block extending between said pair of sidewalls at the first end thereof and being attached to said pair of sidewalls and said second end block extending between said pair of sidewalls at the second end thereof and being attached to said pair of sidewalls; and spacer pieces positionable between adjacent rigid substrates inserted in the sample receiver slots of said first end block and said second end block and between said sidewalls and the rigid substrates.

7. The device of claim 6, further comprising a base plate extending along a horizontal plane and having a pair of two opposite long side edges, each sidewall being attached perpendicularly to one base plate long side edge.

8. The device of claim 6, wherein said second plurality of sample receiver slots in said second end block are aligned offset from said first plurality of sample receiver slots in said first end block.

9. The device of claim 8, wherein opposing sample receiver slots in said first end block and said second end block are offset by an amount approximately equal to the thickness of one of the rigid substrates.

10. The device of claim 8, wherein opposing sample receiver slots are offset to maintain alignment of two rigid substrates of the single lap shear test sample.

11. The device of claim 10, wherein opposing sample receiver slots are in offset alignment so that the two rigid substrates of the single lap shear test sample overlap when inserted in the sample receiver slots of said first end block and said second end block.

12. The device of claim 6, wherein said spacer pieces are molded from an elastomeric material to fill spaces defined by adjacent rigid substrates and spaces defined by said sidewalls and the adjacent rigid substrates.

* * * * *